United States Patent
Decesaris et al.

(10) Patent No.: US 9,933,828 B2
(45) Date of Patent: Apr. 3, 2018

(54) CONTROLLING POWER CONSUMPTION OF A VOLTAGE REGULATOR IN A COMPUTER SYSTEM

(71) Applicant: LENOVO ENTERPRISE SOLUTIONS (SINGAPORE) PTE. LTD., Singapore (SG)

(72) Inventors: Michael Decesaris, Carrboro, NC (US); Luke D. Remis, Raleigh, NC (US); Brian C. Totten, Durham, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 161 days.

(21) Appl. No.: 14/462,779

(22) Filed: Aug. 19, 2014

(65) Prior Publication Data

US 2016/0054784 A1 Feb. 25, 2016

(51) Int. Cl.
G06F 1/32 (2006.01)

(52) U.S. Cl.
CPC ............ G06F 1/3206 (2013.01); G06F 1/324 (2013.01); G06F 1/3225 (2013.01); G06F 1/3234 (2013.01); Y02B 60/1217 (2013.01)

(58) Field of Classification Search
None
See application file for complete search history.

(56) References Cited

U.S. PATENT DOCUMENTS

| | | | |
|---|---|---|---|
| 6,351,827 B1 | 2/2002 | Co et al. | |
| 7,486,573 B2 | 2/2009 | Jeon et al. | |
| 7,616,509 B2 | 11/2009 | Qureshi et al. | |
| 7,642,764 B2 | 1/2010 | Burton et al. | |
| 7,688,656 B2 | 3/2010 | Zhang et al. | |
| 8,181,041 B2 | 5/2012 | Kung et al. | |
| 8,312,306 B2 | 11/2012 | Narendra et al. | |
| 8,456,928 B2 | 6/2013 | Mutnury et al. | |
| 2004/0125623 A1* | 7/2004 | Sankman | H02M 3/00 363/41 |
| 2005/0278463 A1* | 12/2005 | Ando | G06F 13/4217 710/8 |

(Continued)

OTHER PUBLICATIONS

Schuellein, G., et al., "VRM Design Optimization for Varying System Requirements", as presented at Powersystems World 2003 Conference, Nov. 2003, pp. 1-8, International Rectifier (online publication), URL: http://www.irf.com/technical-info/whitepaper/pswus03vrmdesign.pdf.

(Continued)

*Primary Examiner* — Paul Yen
(74) *Attorney, Agent, or Firm* — Brandon C. Kennedy; Jason A. Friday; Kennedy Lenart Spraggins LLP

(57) ABSTRACT

Controlling power consumption of a voltage regulator in a computer system that includes computer memory and the voltage regulator is configured to provide regulated source voltage to the computer memory includes: receiving, by a voltage regulator controller, memory margin statistics of the computer memory, the memory margin statistics including data describing operational tolerance of the computer memory to source voltage signal variations; and adjusting, by the voltage regulator controller, one or more operating characteristics of the voltage regulator in dependence upon the memory margin statistics.

13 Claims, 5 Drawing Sheets

(56) References Cited

U.S. PATENT DOCUMENTS

| | | | |
|---|---|---|---|
| 2006/0101304 A1* | 5/2006 | Miura | G06F 11/1076 714/6.32 |
| 2008/0109703 A1* | 5/2008 | Brandman | G06F 11/1068 714/763 |
| 2009/0128222 A1 | 5/2009 | Zeng et al. | |
| 2009/0167092 A1* | 7/2009 | Ma | G11C 5/147 307/75 |
| 2009/0327786 A1* | 12/2009 | Carroll | G06F 1/26 713/340 |
| 2012/0117402 A1 | 5/2012 | Machnicki et al. | |
| 2012/0311374 A1 | 12/2012 | Felix et al. | |
| 2013/0207630 A1 | 8/2013 | Rahardjo et al. | |

OTHER PUBLICATIONS

Wikipedia, "Buck converter", Wikipedia.org (online publication), accessed Mar. 12, 2014, 15 pages, URL: http://en.wikipedia.org/wiki/Buck_converter.

Wikipedia, "Multiphase buck", from "Buck converter" Wikipedia entry, Wikipedia.org (online publication), accessed Mar. 13, 2014, 2 pages, URL: http://en.wikipedia.org/wiki/Buck_converter.

* cited by examiner

CONTROLLING POWER CONSUMPTION OF A VOLTAGE REGULATOR IN A COMPUTER SYSTEM

BACKGROUND OF THE INVENTION

Field of the Invention

The field of the invention is data processing, or, more specifically, methods, apparatus, and products for controlling power consumption of a voltage regulator in a computer system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One result of such powerful computer systems is an increase in power consumption of various components. Power consumption is also a concern due to the prevalence of portable devices that utilize a finite amount of battery power. To that end, it has become important to manage power consumption of various components of computer systems. For example, a small increase in efficiency of a voltage regulator has a large impact on energy savings for the system.

SUMMARY OF THE INVENTION

Methods, apparatus, and products for controlling power consumption of a voltage regulator in a computer system are disclosed in this specification. The computer system includes a computer memory, and the voltage regulator is configured to provide regulated source voltage to the computer memory. The method includes receiving, by a voltage regulator controller, memory margin statistics of the computer memory, the memory margin statistics include data describing operational tolerance of the computer memory to source voltage signal variations. The method also includes adjusting, by the voltage regulator controller, one or more operating characteristics of the voltage regulator in dependence upon the memory margin statistics.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
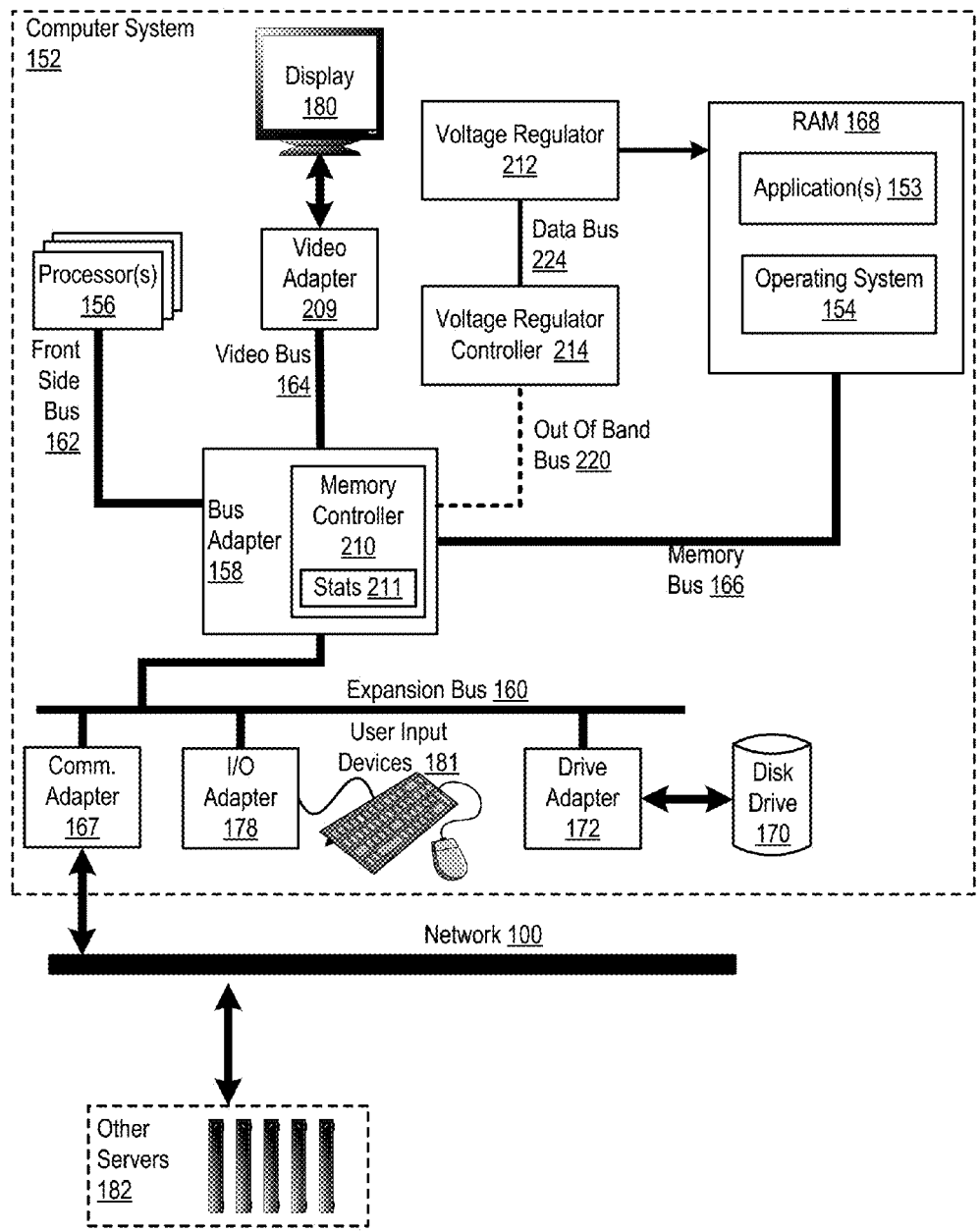
FIG. 1 sets forth a network diagram of a system for controlling power consumption of a voltage regulator in a computer system according to embodiments of the present invention.

Exemplary methods, apparatus, and products for controlling power consumption of a voltage regulator in a computer system in accordance with the present invention are described with reference to the accompanying drawings, beginning with FIG. 1. FIG. 1 sets forth a network diagram of a system for controlling power consumption of a voltage regulator in a computer system according to embodiments of the present invention. The system of FIG. 1 includes a block diagram of automated computing machinery in the form of a computer system (152) which is useful in controlling power consumption of a voltage regulator in the computer system (152) according to embodiments of the present invention. The computer system (152) of FIG. 1 includes at least one computer processor (156) or 'CPU' as well as computer memory, such as random access memory (168) ('RAM') which is connected through a high speed memory bus (166) and bus adapter (158) to processor (156) and to other components of the computer (152).

The example computer system (152) of FIG. 1 also includes a voltage regulator (212). In this example, the voltage regulator provides regulated source voltage to RAM (168). In some embodiments, additional voltage regulators may be included in the example computer system of FIG. 1 to supply regulated voltage to other components.

The example computer system (152) of FIG. 1 also includes a voltage regulator controller (214) configured to control power consumption of the voltage regulator (212) in accordance with embodiments of the present invention. The voltage regulator controller (214) is coupled to the voltage regulator (212) across a data bus (224). In addition, the voltage regulator controller (214) is coupled to the memory controller (210) across an out of band bus (220).

The memory controller (210) in the example of FIG. 1 may run various tests on the memory (168) at various times. For example, the memory controller (210) may initiate a memory margin statistics tests on the RAM (168) at startup, prior to loading the operating system (154). In some embodiments, the memory controller may initiate such a memory margin statistics test on the RAM (168) dynamically, periodically or upon request, throughout the operation of the RAM (168) and the computer system. The memory controller may perform the memory margin statistics test by writing and reading to various memory cells across the memory bus (166) with a predefined bit pattern with variations in the source voltage signal being provided to the RAM (168). The result of such a test may be data gathered in the form of eye diagram data. In this way, the memory margin statistics (211) include data describing the operational tolerance of the computer memory to variations in the source voltage signal. Such variations may include variations in any of frequency, edge rates, signal phase, peak to peak voltage ranges, and other signal characteristics. Although the memory controller (210) in the example of FIG. 1 is depicted as a component of the bus adapter (158), readers of skill in the art will recognize that such a memory controller (210) may also be implemented as a standalone component, as a subcomponent of another component of the computer (152) and so on. Additionally, the memory controller (210) is but one example among many possible components that may carry out such memory margins statistic testing. Other components that may carry out such testing may include components within the processor (156), firmware (not shown), BIOS (Basic Input/Output Service), and the like.

In one or more embodiments, the voltage regulator control (214) receives the memory margin statistics (211) from the memory controller (210). The memory margin statistics describe the operational tolerance of the computer memory to variations in the source voltage signal. Such variations may include variations in any of frequency, edge rates, signal phase, peak to peak voltage ranges, and other signal characteristics. The voltage regulator controller (214) adjusts one or more operating characteristics of the voltage regulator in dependence upon the memory margin statistics. The term 'operating characteristic' as it is used in this specification refers to various forms of configurable functionality of a voltage regulator. Such operating characteristics, for example, may include a frequency of the pulse-width modulated (PWM) switching signal, the number of phases active and employed while provided regulated voltage, and the like.

Stored in RAM (168) is one or more user level applications (153), module of computer program instructions that, when executed, cause the computer system (152) to carry out user level data processing tasks. Examples of such applications include word processors, spreadsheet applications, media library management applications, gaming applications, and so on as will occur to readers of skill in the art.

Also Stored in RAM (168) is an operating system (154). Operating systems useful in computers configured for failover in a data center that includes a multi-density server according to embodiments of the present invention include UNIX™, Linux™, Microsoft Windows™, OS X™, Google Chrome OS™, AIX™, IBM's i5/OS™, and others as will occur to those of skill in the art. The operating system (154) and user level applications (153) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer system (152). Disk drive adapter (172) connects non-volatile data storage to the computer system (152) in the form of disk drive (170). Disk drive adapters useful in computers configured for controlling power consumption of a voltage regulator in the computer system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer system (152) of FIG. 1 includes a communications adapter (167) for data communications with other servers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for failover in a data center that includes a multi-density server according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
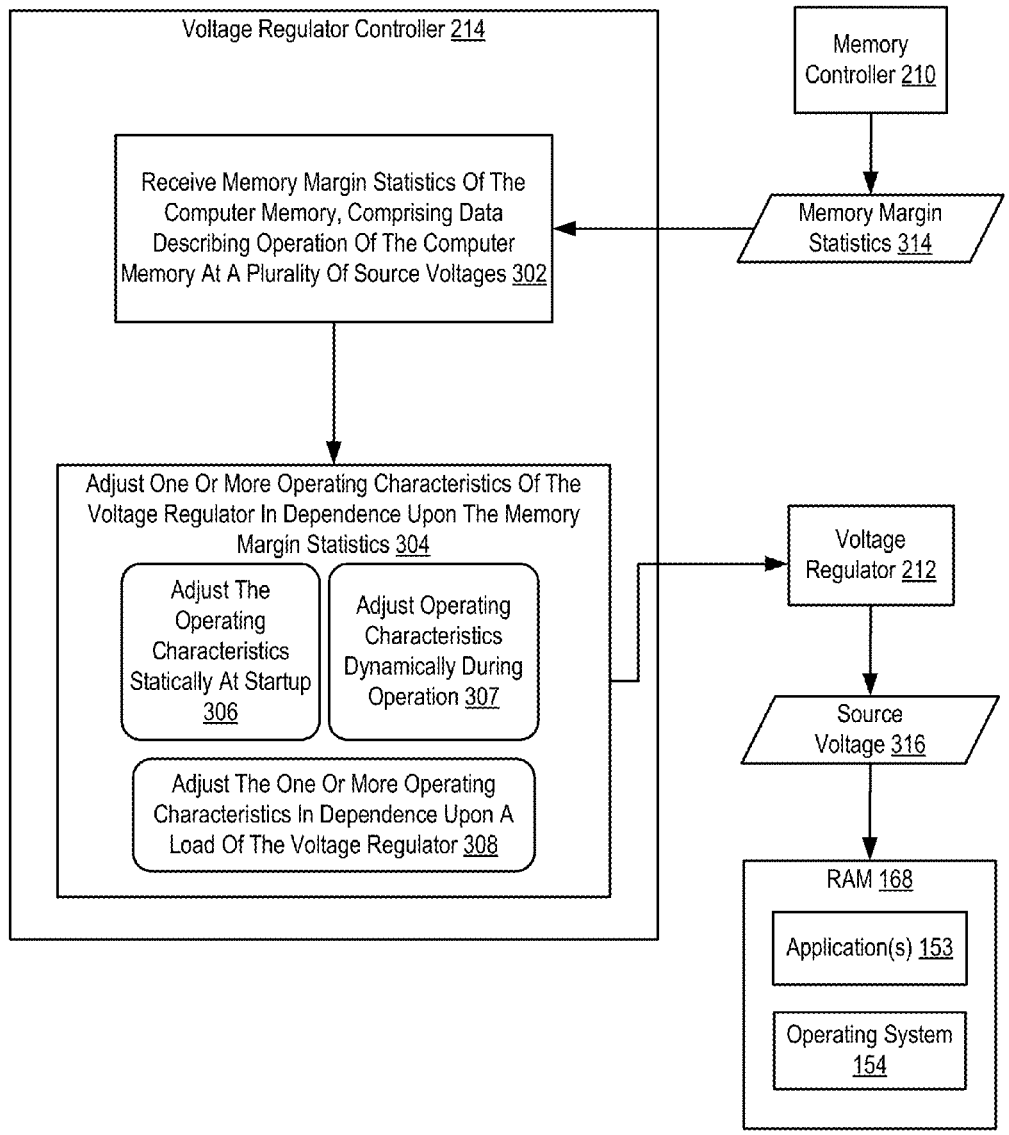
FIG. 2 sets forth a flow chart illustrating an example method for controlling power consumption of a voltage regulator in a computer system according to embodiments of the invention.

For further explanation, FIG. 2 sets forth a flow chart illustrating an exemplary method for controlling power consumption of a voltage regulator in a computer system according to embodiments of the present invention. The method of FIG. 2 may be carried out in a computer system similar to that of the computer system (152) of FIG. 1. The computer system (152) may include a computer memory (168) and a voltage regulator (212) configured to provide regulated source voltage to the computer memory (168).

The method of FIG. 2 includes receiving (302), by a voltage regulator controller (214), memory margin statistics of the computer memory. The memory margin statistics include data describing operational tolerance of the computer memory (168) to source voltage signal variations.

The method of FIG. 2 includes receiving (302), by a voltage regulator controller (214), memory margin statistics (314) of the computer memory. Receiving (302) memory margin statistics (314) of the computer memory may be carried out by receiving the statistics (314) from a memory controller (210) that previously ran a memory margin statistics test on the computer memory. The memory margin statistics are data describing operational tolerance of the computer memory to source voltage signal variations.

The method of FIG. 2 also includes adjusting (304), by the voltage regulator controller (214), one or more operating characteristics of the voltage regulator (212) in dependence upon the memory margin statistics (314). In the example of FIG. 2, adjusting (304) one or more operating characteristics of the voltage regulator (212) may be carried out by adjusting (306) the one or more operating characteristics of the voltage regulator statically at startup of the computer system or adjusting (308) the one or more operating characteristics of the voltage regulator dynamically during operation of the voltage regulator.

Also in the method of FIG. 2, adjusting (304), by the voltage regulator controller (214), one or more operating characteristics of the voltage regulator (212) in dependence upon the memory margin statistics (314) may include adjusting (308) the one or more operating characteristics in dependence upon a load of the voltage regulator. That is, in addition to utilizing the memory margins statistics to determine adjustments of the operating characteristics, the load of the voltage regulator may also play a factor in the determination of the adjustments.

Figure 3:
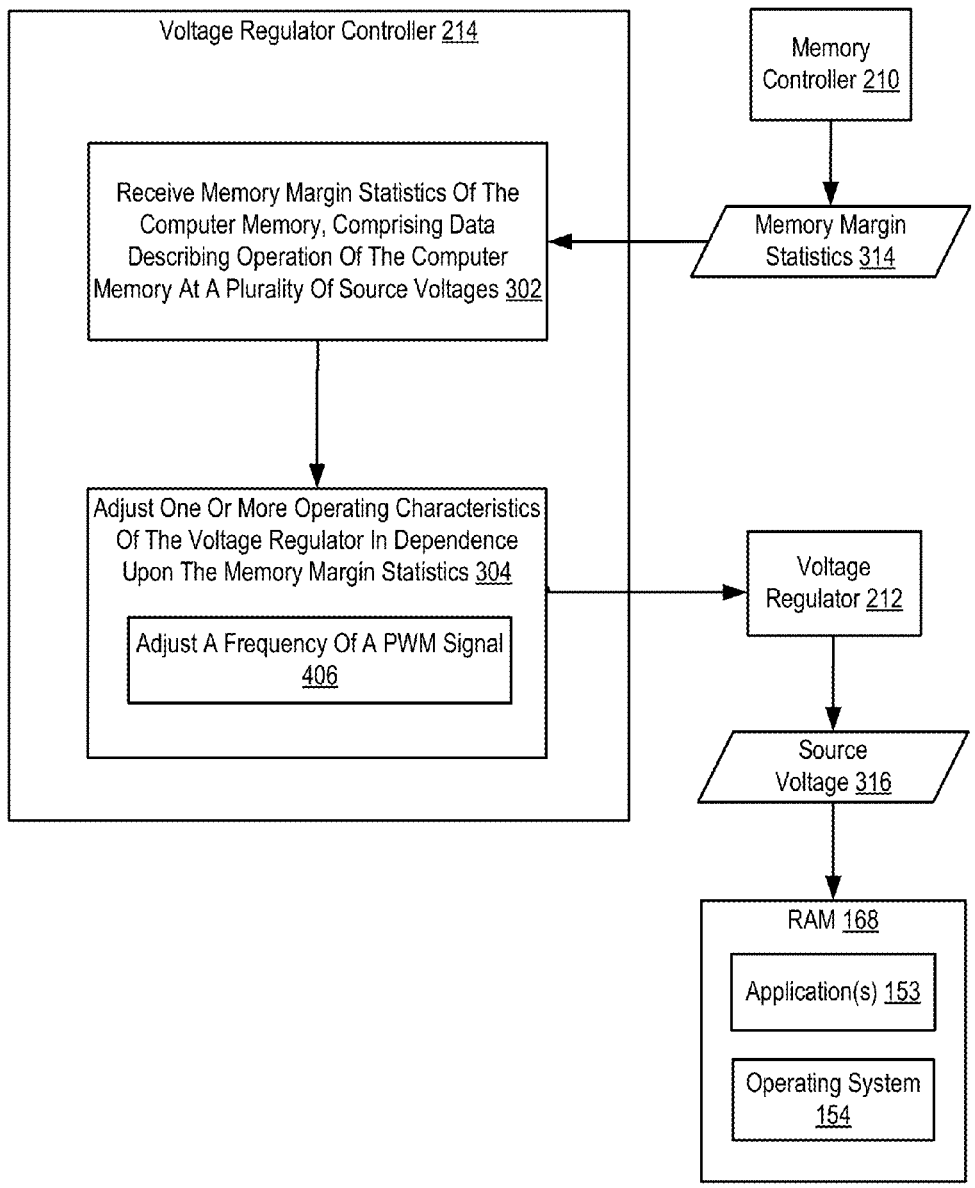
FIG. 3 sets forth a flow chart illustrating an example method for controlling power consumption of a voltage regulator in a computer system by adjusting a frequency of a PWM signal according to embodiments of the invention.

For further explanation, FIG. 3 sets forth a flow chart illustrating an example method for controlling power consumption of a voltage regulator in a computer system according to embodiments of the present invention. The method of FIG. 3 may be carried out in a computer system similar to computer system (152) of FIG. 1 which includes a computer memory (168), and a voltage regulator (212) configured to provide regulated source voltage to the computer memory (168). The method of FIG. 3 is similar to the method of FIG. 2 in that the method of FIG. 3 includes receiving (302) memory margin statistics and adjusting (304) one or more operating characteristics of the voltage regulator in dependence upon the memory margin statistics.

The method of FIG. 3 differs from the method of FIG. 2, however, in that in the method of FIG. 3, adjusting (304) one or more operating characteristics of the voltage regulator includes adjusting (406), a frequency of a PWM signal provided to the voltage regulator. The PWM signal controls the switching of transistors in each phase of the voltage regulator. Power is dissipated through the switches of the phase when the switch is transitioning between on and off. The greater the switching frequency, therefore, the more power is consumed and dissipated rather than utilized. Adjusting the frequency of the PWM signal therefore may control power consumption by increasing or decreasing the amount of time the switches are transitioning. According to one or more embodiments, the voltage regulator controller (214) may determine a preferred frequency for the PWM signal based on the minimal frequency required for the PWM signal, as well as a resultant output ripple of the frequency. That is, while a lower frequency PWM will allow for a less power consuming system, a lower frequency will increase output ripple in the regulated voltage source.

Figure 4:
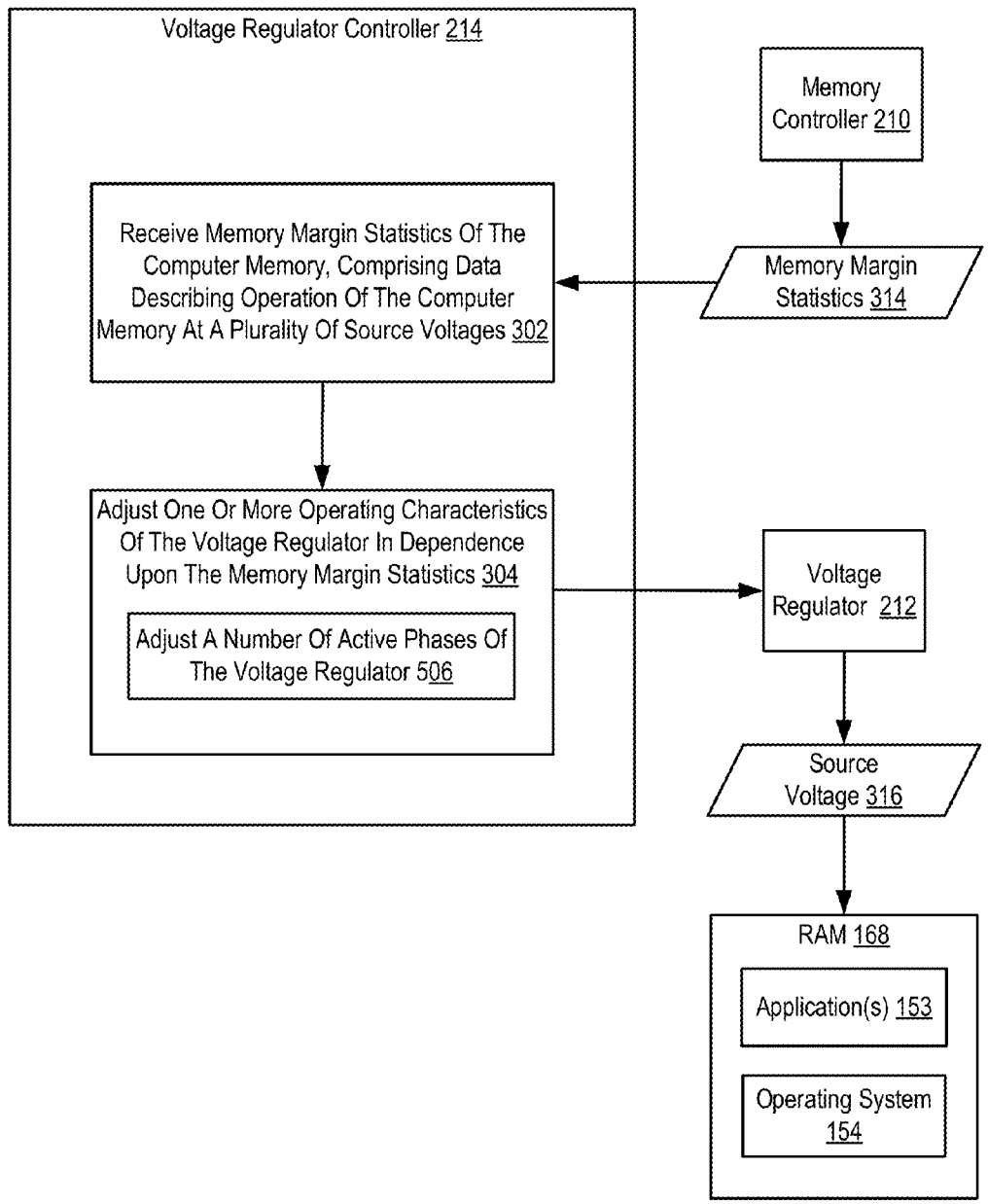
FIG. 4 sets forth a flow chart illustrating an example method for controlling power consumption of a voltage regulator in a computer system by adjusting a number of active phases of the voltage regulator according to embodiments of the invention.

For further explanation, FIG. 4 sets forth a flow chart illustrating an example method for controlling power consumption of a voltage regulator in a computer system according to embodiments of the present invention. The method of FIG. 4 may be carried out in a computer system similar to that of FIG. 1 which includes a computer memory (168), and a voltage regulator (212) configured to provide regulated source voltage to the computer memory (168). The method of FIG. 4 is similar to the method of FIG. 2 in that the method of FIG. 4 includes receiving (302) memory margin statistics of the computer memory and adjusting (304) one or more operating characteristics of the voltage regulator in dependence upon the memory margin statistics.

The method of FIG. 4 differs from the method of FIG. 2, however, in that in the method of FIG. 4, adjusting (304) one or more operating characteristics of the voltage regulator in dependence upon the memory margin statistics includes adjusting (506) a number of active phases of the voltage regulator (212). The voltage regulator controller (214) may utilize the memory margin statistics (314) as an input into a phase shedding algorithm and modify the number of active phases. Modifying the number of active phases results in a modification of power consumption of the voltage regulator.

The voltage regulator controller (214) may adjust a number of active phases of the voltage regulator (212) in various ways including, for example, by determining a rate of power consumption and source current for each of a potential new number of active phases, selecting the new number of active phases based on the determined rate of power consumption, source current for the new number of active phases, and a tolerance for source current indicated by the memory margin statistics. Once selected, the voltage regulator controller (214) may adjust operation of the voltage regulator (212) to use the selected number of active phases. Thus, in one or more embodiments, the adjusted number of active phases allows for less active phase to be used by the voltage regulator (212) when sufficient memory margin is available.

Figure 5:
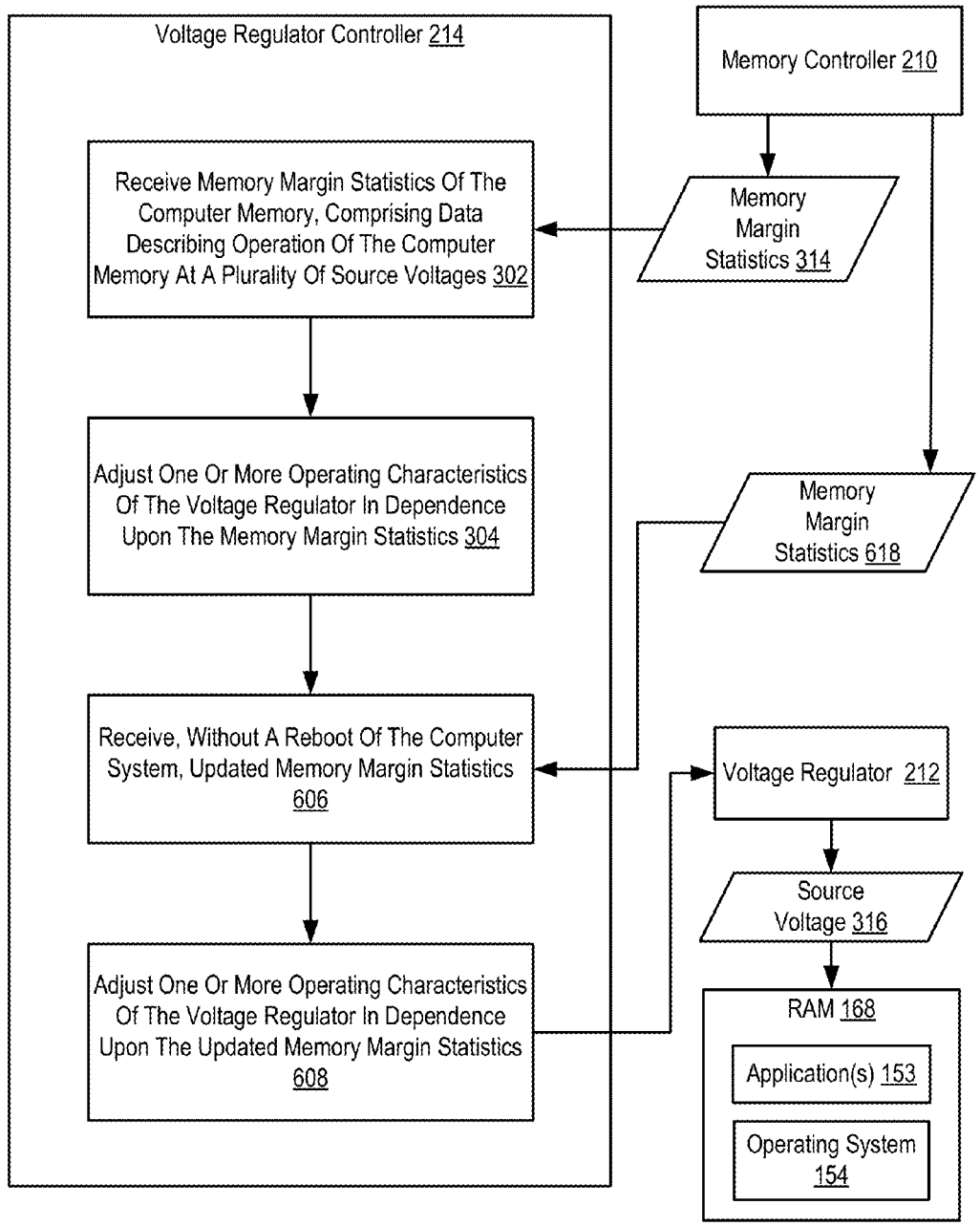
FIG. 5 sets forth a flow chart illustrating an example method for controlling power consumption of a voltage regulator in a computer system using updated memory margin statistics according to embodiments of the invention.

For further explanation, FIG. 5 sets forth a flow chart illustrating an example method for controlling power consumption of a voltage regulator in a computer system using updated memory margin statistics according to embodiments of the invention. The method of FIG. 5 may be carried out in a computer system similar to that of FIG. 1 which includes a computer memory (168), and a voltage regulator (212) configured to provide regulated source voltage to the computer memory (168). The method of FIG. 5 is similar to the method of FIG. 2 in that the method of FIG. 5 includes receiving (302) memory margin statistics of the computer memory and adjusting (304) one or more operating characteristics of the voltage regulator in dependence upon the memory margin statistics.

The method of FIG. 5 differs from the method of FIG. 2, however, in that the example method also includes receiving (606), by the voltage regulator controller (214), without a reboot of the computer system, updated memory margin statistics. That is, the voltage regulator controller (214) may receive updated memory margin statistics not only upon startup of the computer system, but the voltage regulator controller (214) may also receive updated memory margin statistics (618) during operation of the computer system. The updated memory margin statistics provide updated data describing operational tolerance of the computer memory to source voltage signal variations. In one or more embodiments, the voltage regulator controller (214) receives the updated memory margin statistics (618) from the memory controller (210).

The example method of FIG. 5 also includes adjusting (608), by the voltage regulator controller (214), one or more operating characteristics of the voltage regulator (212) in dependence upon the updated memory margin statistics (618). The voltage regulator (212) then continues to provide source voltage (316) to the computer memory (168) using the adjusted operating characteristics. As described above, in one or more embodiments, the adjusted operating characteristics may include adjusting a frequency of a PWM signal, or adjusting a number of active phases of the voltage regulator (212).

In view of the explanations set forth above, readers will recognize that the benefits of controlling power consumption of a voltage regulator in a computer system according to embodiments of the present invention include utilizing memory margin statistics that describe operation of the computer memory to adjust operation of the voltage regulator in order to control power consumption. That is, embodiments are directed to using memory margin statistics that describe operation of the computer memory to adjust operating characteristics of the voltage regulator providing source voltage to the computer memory. Further, in one or more embodiments, adjusting operating characteristics of the voltage regulator may include adjusting a frequency of a pulse-width modulation signal of the voltage regulator, or adjusting a number of active phases of the voltage regulator.

Exemplary embodiments of the present invention are described largely in the context of a fully functional computer system for controlling power consumption of a voltage regulator in a computer system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of controlling power consumption of a voltage regulator in a computer system, the computer system comprising computer memory, the voltage regulator configured to provide regulated source voltage to the computer memory, the method comprising, by computer program instructions in a voltage regulator controller on a computing device:
    performing a memory margin statistics test including writing and reading to each individual memory of the computer memory with a bit pattern with variations in source signal determining upper and lower tolerances, wherein the memory margin statistics test produces memory margins statistics of each individual memory of the computer memory;
    receiving the memory margin statistics of each individual memory of the computer memory, the memory margin statistics comprising data describing operational tolerance of each individual memory of the computer memory to source voltage signal variations including variations in frequency and peak to peak voltage ranges; and
    adjusting one or more operating characteristics of the voltage regulator to manage power consumption in dependence upon the memory margin statistics, including adjusting a frequency of a pulse-width modulated signal that controls switching of transistors in each phase of the voltage regulator and further including adjusting a number of active phases of the voltage regulator including:
        determining a rate of power consumption and a source current for each of a potential new number of active phases; and
        selecting the new number of active phases based on the determined rate of power consumption for the new number of active phases, the source current for the new number of active phases, and a tolerance for source current indicated by the memory margin statistics.

2. The method of claim 1, wherein adjusting the one or more operating characteristics of the voltage regulator further comprises adjusting the one or more operating characteristics of the voltage regulator dynamically during operation of the voltage regulator.

3. The method of claim 1, further comprising:
    receiving without a reboot of the computer system, updated memory margin statistics;
    readjusting the one or more operating characteristics of the voltage regulator in dependence upon the updated memory margin statistics.

4. The method of claim 1, wherein adjusting one or more operating characteristics of the voltage regulator further comprises adjusting the one or more operating characteristics in dependence upon a load of the voltage regulator.

5. The method of claim 1, wherein adjusting a number of active phases of the voltage regulator further includes:
    utilizing the memory margin statistics as an input into a phase shedding algorithm; and
    modifying the number of active phases based on the phase shedding algorithm.

6. An apparatus for controlling power consumption of a voltage regulator in a computer system, the apparatus comprising a computer processor, a computer memory operatively coupled to the computer processor, the voltage regulator configured to provide regulated source voltage to the computer memory, the computer memory having disposed within it computer program instructions that, when executed by the computer processor, cause the apparatus to carry out the steps of:
    performing a memory margin statistics test including writing and reading to each individual memory of the computer memory with a bit pattern with variations in source signal determining upper and lower tolerances, wherein the memory margin statistics test produces memory margins statistics of each individual memory of the computer memory;
    receiving the memory margin statistics of each individual memory of the computer memory, the memory margin statistics comprising data describing operational tolerance of each individual memory of the computer memory to source voltage signal variations including variations in frequency and peak to peak voltage ranges; and
    adjusting one or more operating characteristics of the voltage regulator to manage power consumption in dependence upon the memory margin statistics, including adjusting a frequency of a pulse-width modulated signal that controls switching of transistors in each phase of the voltage regulator and further including adjusting a number of active phases of the voltage regulator including:

determining a rate of power consumption and a source current for each of a potential new number of active phases; and selecting the new number of active phases based on the determined rate of power consumption for the new number of active phases, the source current for the new number of active phases, and a tolerance for source current indicated by the memory margin statistics.

7. The apparatus of claim 6, wherein adjusting the one or more operating characteristics of the voltage regulator further comprises adjusting the one or more operating characteristics of the voltage regulator dynamically during operation of the voltage regulator.

8. The apparatus of claim 6, further comprising computer program instructions which, when executed by the computer processor, cause the apparatus to carry out the steps of:

receiving without a reboot of the computer system, updated memory margin statistics;

adjusting the one or more operating characteristics of the voltage regulator in dependence upon the updated memory margin statistics.

9. The apparatus of claim 6, wherein adjusting one or more operating characteristics of the voltage regulator further comprises adjusting the one or more operating characteristics in dependence upon a load of the voltage regulator.

10. A computer program product for controlling power consumption of a voltage regulator in a computer system, the computer system comprising computer memory, the voltage regulator configured to provide regulated source voltage to the computer memory, the computer program product disposed upon a non-transitory computer readable storage medium, the computer program product comprising computer program instructions that, when executed, cause a computer to carry out the steps of:

performing a memory margin statistics test including writing and reading to each individual memory of the computer memory with a bit pattern with variations in source signal determining upper and lower tolerances, wherein the memory margin statistics test produces memory margins statistics of each individual memory of the computer memory;

receiving the memory margin statistics of each individual memory of the computer memory, the memory margin statistics comprising data describing operational tolerance of each individual memory of the computer memory to source voltage signal variations including variations in frequency and peak to peak voltage ranges; and adjusting one or more operating characteristics of the voltage regulator to manage power consumption in dependence upon the memory margin statistics, including adjusting a frequency of a pulse-width modulated signal that controls switching of transistors in each phase of the voltage regulator and further including adjusting a number of active phases of the voltage regulator including:

determining a rate of power consumption and a source current for each of a potential new number of active phases; and selecting the new number of active phases based on the determined rate of power consumption for the new number of active phases, the source current for the new number of active phases, and a tolerance for source current indicated by the memory margin statistics.

11. The computer program product of claim 10, wherein adjusting the one or more operating characteristics of the voltage regulator further comprises adjusting the one or more operating characteristics of the voltage regulator dynamically during operation of the voltage regulator.

12. The computer program product of claim 10, computer program instructions which, when executed, cause the computer to carry out the steps of:

receiving without a reboot of the computer system, updated memory margin statistics;

adjusting the one or more operating characteristics of the voltage regulator in dependence upon the updated memory margin statistics.

13. The computer program product of claim 10, wherein adjusting one or more operating characteristics of the voltage regulator further comprises adjusting the one or more operating characteristics in dependence upon a load of the voltage regulator.

* * * * *